No. 723,791. PATENTED MAR. 24, 1903.
G. A. WASHBURN.
CONNECTOR FOR ACCUMULATOR PLATES.
APPLICATION FILED OCT. 6, 1902.

NO MODEL.

WITNESSES:
F. Daley.
E. L. Pardee.

INVENTOR.
George A. Washburn
BY
his ATTORNEY.

UNITED STATES PATENT OFFICE.

GEORGE A. WASHBURN, OF CLEVELAND, OHIO, ASSIGNOR, BY MESNE ASSIGNMENTS, TO THE AMERICAN MOTOR CARRIAGE COMPANY, OF CLEVELAND, OHIO, A CORPORATION OF DELAWARE.

CONNECTOR FOR ACCUMULATOR-PLATES.

SPECIFICATION forming part of Letters Patent No. 723,791, dated March 24, 1903.

Original application filed July 28, 1902, Serial No. 117,313. Divided and this application filed October 6, 1902. Serial No. 126,106. (No model.)

*To all whom it may concern:*

Be it known that I, GEORGE A. WASHBURN, a citizen of the United States, residing at Cleveland, in the county of Cuyahoga and State of Ohio, have invented certain new and useful Improvements in Connectors for Accumulator-Plates, of which the following is a specification, reference being had therein to the accompanying drawings.

This application is a division of an application for improvements in electric accumulators filed July 28, 1902.

It relates to connectors such as are used to join the positive-pole plates with the negative-pole plates of adjacent cells of a storage battery or accumulator.

A principal object has been to provide a device for this purpose which is very simple in form and which affords means for maintaining the adjacent cells in proper relation to each other.

The invention consists in a certain construction of parts, to be more fully described hereinafter and definitely set forth in the claims.

Figure 1:
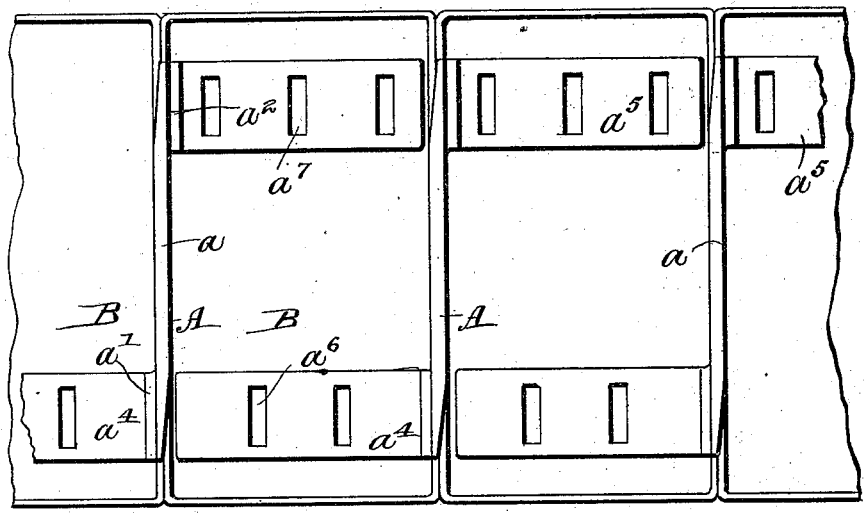
Figure 2:
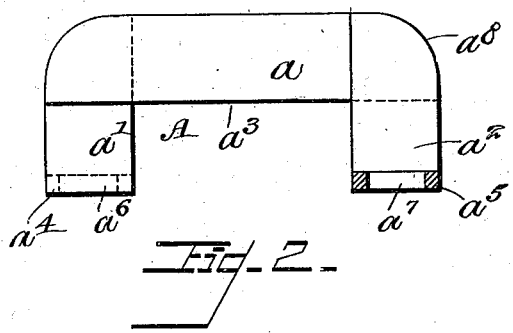

In the drawings, which fully illustrate my invention, Figure 1 is a plan showing several cells arranged to constitute a battery the plates of which are joined by this connector, the end cells being only partially shown, as indicated. Fig. 2 is an elevation of my connector, a part being shown in section, as will appear.

Referring to the parts by letters, A represents the connector, and B represents the individual cells constituting the storage battery. As will appear from Fig. 1, these cells are arranged side by side, there being as many of them as desired, and, as indicated, they are substantially rectangular receptacles. As will appear from the construction of the connector A, it is adapted to be placed upon the upper edges of two adjacent or abutting sides of two adjoining cells in the manner shown in Fig. 1.

The connector consists, substantially, of a back or body $a$, adapted to be disposed longitudinally with the upper edges of adjacent cells, and it is of suitable thickness for carrying the current between two adjoining cells and provided at its extremities with downwardly-projecting arms $a'$ $a^2$, disposed on opposite sides of the back $a$. In this manner a surface or edge $a^3$ is formed, passing continuously from end to end of the connector and constituting the lower edge of the back $a$, as will readily be understood. At their lower extremities these arms are provided, respectively, with laterally-projecting heads $a^4$ $a^5$, having, respectively, vertical openings $a^6$ $a^7$, corresponding with the plates of the battery. The openings $a^6$ are adapted to receive the lugs of the negative-pole plates, which project upward through them and which may be secured thereto in any suitable manner.

The openings $a^7$ are arranged intermediate of the openings $a^6$, as represented, and are adapted to receive the lugs of the positive-pole plates, to which the head $a^4$ is attached. The upper edge of the back is preferably rounded at the ends, as indicated at $a^8$.

This connector enables a suitable number of cells to be quickly and compactly arranged in a battery in the manner described, and it should be observed that the form of the back $a$ is well adapted to resist the weight of the battery-plates.

What I claim is—

1. As a new article of manufacture, a connector for accumulator-plates, said connector comprising a member adapted to rest upon the adjacent edges of abutting cells and having downward extensions adapted to lie against the inner sides of said cells, substantially as described.

2. As a new article of manufacture, a connector for accumulator-plates consisting of a member adapted to rest upon the adjacent edges of abutting cells and having downward extensions within said cells adapted to connect with the plates of said cells, and means carried by said connector for maintaining adjoining cells in a fixed relation, substantially as set forth.

3. As a new article of manufacture, a connector for accumulator-plates, consisting of a member adapted to rest upon the adjacent edges of abutting cells, said member having a downward extension at each extremity and on opposite sides thereof, said downward extensions having integral heads projecting therefrom, adapted to connect with the plates, substantially as set forth.

4. As a new article of manufacture, a connector comprising a deep flat member disposed longitudinally above the adjacent edges of two adjacent cells and having downward extensions lying against the walls of the said adjacent cells, said downward extensions being adapted to connect with the plates of said cells, substantially as described.

In testimony whereof I affix my signature in the presence of two witnesses.

GEORGE A. WASHBURN.

Witnesses:
F. D. AMMEN,
E. L. PARDU.